United States Patent [19]

Mamaghani et al.

[11] Patent Number: 5,574,728
[45] Date of Patent: Nov. 12, 1996

[54] METHODS OF TERMINAL REGISTRATION

[75] Inventors: Farzan Mamaghani, Bothell, Wash.; Thomas W. Lockhart, Richmond, Canada; William H. Kilner, Monroe, Wash.

[73] Assignee: Motorola, Inc., Schaumburg, Ill.

[21] Appl. No.: 495,275

[22] Filed: Jun. 27, 1995

[51] Int. Cl.$^6$ .................................................. H04J 3/16
[52] U.S. Cl. ...................... 370/95.1; 370/85.2; 370/85.7; 395/200.06
[58] Field of Search .................... 370/85.1–9, 11, 370/94.1–3, 95.1, 95.3; 340/825.5, 825.51; 395/200.06, 200.12

[56] References Cited

U.S. PATENT DOCUMENTS

| | | | |
|---|---|---|---|
| 4,742,512 | 3/1988 | Akashi et al. | 370/96 |
| 5,067,127 | 11/1991 | Ochiai | 370/58.1 |
| 5,216,427 | 6/1993 | Yan et al. | 370/94.1 |
| 5,384,777 | 1/1995 | Ahmadi et al. | 370/85.2 |
| 5,404,355 | 4/1995 | Raith | 370/94.1 |
| 5,461,627 | 10/1995 | Rypinski | 370/95.2 |
| 5,493,569 | 2/1996 | Buchholz et al. | 370/85.7 |

OTHER PUBLICATIONS

Bernard Sklar, Digital Communications: Fundamentals and Applications, PTR Prentice Hall, p. 528.

*Primary Examiner*—Douglas W. Olms
*Assistant Examiner*—Matthew C. Phillips
*Attorney, Agent, or Firm*—Charles W. Bethards; Kevin A. Buford

[57] ABSTRACT

In a data communication system (100) including infrastructure (101) arranged to communicate with a plurality of terminals (103) over a channel (109), a method of adaptable registration includes determining a registration status (401), and executing a registration contention procedure adaptable to the registration status (403). A corresponding method of facilitating adaptable registration includes determining a registration contention information (501), the registration contention information corresponding to a contention procedure implemented by the plurality of terminals, and sending a message corresponding to said system registration information (519).

13 Claims, 4 Drawing Sheets

METHODS OF TERMINAL REGISTRATION

FIELD OF THE INVENTION

The instant disclosure deals with communication systems and more particularly but not limited to methods of terminal registration having applicability in data communication systems.

BACKGROUND OF THE INVENTION

Multiple access communication systems are designed to provide access to limited communication resources, such as a channel, by a plurality of communication terminals for the purpose of exchanging communication messages, referred to variously as packets, data packets, messages, etc., between an infrastructure or network and the terminal. Many multiple access communication systems require the terminals to register on or with the system before the system will identify the terminals as legitimate users of the system. Many of these systems implement registration procedures that limit the number and type of terminal which is allowed to register. For instance, registration procedures exist where a terminal is not allowed to register after a maximum number of registration attempts in a particular time span.

Also, registration procedures exist where the terminal's authorized level of service is compared to the level of service currently in effect in the communication system. If the terminal has a level of service greater than or equal to the current level being serviced by the system the terminal is allowed to register immediately. Otherwise the terminal must abort registration.

A problem exists in these registration procedures when a large number of terminals attempt to register at the same time. Such a situation may arise when the advertised current level of service is decreased. A large number of low service level terminals, that previously could not register on the system, now have an authorized service level high enough to warrant registration and thus attempt to do so. This may result in very few or even no terminals successfully registering since the terminals all attempt to send messages concurrently thereby causing multiple collisions. The problem may be further exacerbated when the terminals, after unsuccessfully attempting registration, reattempt registration at the next available time and cause yet another message collision. This could continue to occur indefinitely. These scenarios result in inefficient use of communication resources, specifically channel capacity.

Accordingly, there is a need for an adaptive registration process which will facilitate a more efficient utilization of communication resources.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
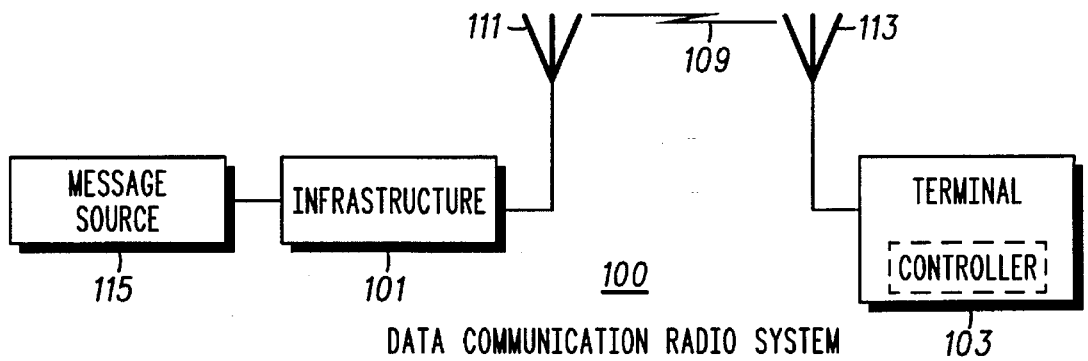
FIG. 1 is a block diagram of a wireless data communications system suitable for employing an embodiment in accordance with the instant invention.

Generally the present invention deals with methods of channel registration in a communications system or more specifically methods of adaptively facilitating channel registration in a data communications system. Generally the data communications system includes infrastructure, such as base stations and network controllers and the like all arranged and constructed to communicate with a plurality of terminals, such as wireless modems, portable or mobile data terminals or computers with wireless connectivity or the like, over a channel, preferably a radio wave channel but alternatively a wired channel such as coaxial or the like. A preferred method embodiment of adaptable registration is practiced at a terminal and includes determining a registration status and executing a registration contention procedure which is adapted to the registration status.

The registration status may be based on registration information received from, for example, the infrastructure, such as information corresponding; to an expected number of terminals that will attempt to register for service, to a channel loading factor, a channel access level or change thereto, and the like, either singularly or in combination. Additionally the registration status may be a function of information available to the terminal alone, such as a number of registration attempts, a terminal priority, and the like. Ultimately and preferably the registration procedure includes determining when a random delay should be used before a registration attempt is made as well as what the duration of the random delay should be or be adapted to. After the adaptable delay, the registration attempt may be in accordance with reasonably well known techniques and procedures found in slotted ALOHA or Digital Sense Multiple Access (DSMA) systems, etc. It should be noted that known registration procedures exist that determine if a terminal is allowed to register. The instant invention, however, is in accordance with a contention registration procedure relating to when a terminal may attempt to register.

A similar and alternative preferred method embodiment operates in a similar setting and is practiced by the infrastructure. This method of facilitating an adaptable registration procedure by the terminal, includes determining system registration information, and sending a message that corresponds to the system registration information. The registration information includes or corresponds, for example, to a number of terminals expected to register for service on the system, a channel loading factor, a channel access level or change thereto, or a delay registration indicator. This additional registration information, referred to here as registration contention information, is used by the terminal to determine an appropriate contention procedure. It is further noted that such information may be used in combination to derive an appropriate registration contention procedure depending on system specifics and experimental determinations.

The instant invention can be more fully described, thus appreciated, with reference to the figures in which FIG. 1 depicts a data communications system (100). The data communications system (100) includes a message source (115), such as a public switched telephone or data network, shown coupled to an infrastructure (101). The infrastructure (101) includes, in a preferred form, a transceiver or base station coupled to an antenna (111) and operating to receive and transmit radio signals over a channel (109) that is, preferably, a radio channel. The radio signals are transmitted from or received by an antenna (113) that is coupled to a data terminal (103) or terminal. The data terminal (103) operates to receive and convert radio signals into data messages and vice a versa in addition to establishing and maintaining the link via the channel (109) with the infrastructure (101).

It should be noted that while FIG. 1 depicts only one channel, one data terminal, and one infrastructure antenna or base station, a practical system may include a plurality of each. Generally the data communications system (100) is intended to supply specific messages to/from specific terminals in a largely transparent (to end users) fashion. Although FIG. 1 depicts the preferred wireless or radio data communications system (100), the instant invention is expected to have equal applicability to wired data communications systems. Additionally the instant invention is expected to have applicability to data communications regardless of the specific form the data terminal may take.

Figure 2:
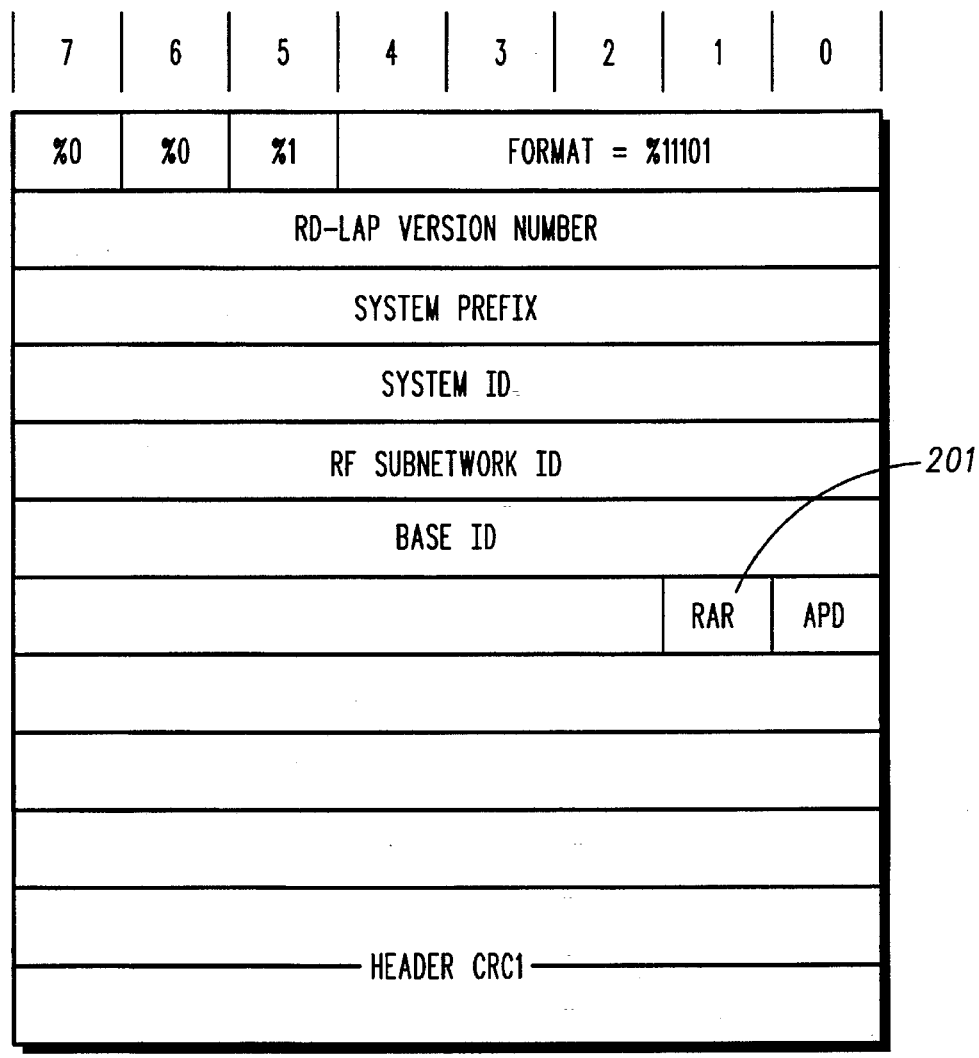
FIG. 2 is a representation of a received message suitable for use in a preferred method embodiment in accordance with the instant invention.

Referring to the FIG. 2 representation of a message suitable for use in a preferred embodiment, an IDLE message (200) or received message including an indicator (201) is depicted. In the preferred embodiment, specifically operating in a Radio Data Link Access Procedure (RD-LAP) system available from Motorola, the IDLE message (200) contains other system parameters in addition to the indicator (201). The idle message will be broadcast from time to time, such as whenever the infrastructure has no other information to broadcast or send to one or more terminals, on the downlink or infrastructure to terminal rather than uplink or terminal to infrastructure portion of the channel. All terminals will receive this message and it's contents allow each terminal to make various configuration decisions so as to facilitate further operation on the system. The other system parameters contain various information, such as information identifying various system parameters. These system parameters will take forms depending on the particular system, are generally well known, and are not material to nor further discussed within this disclosure. However, the registration indicator (201) contains information on whether the channel (109) has or will become available for restricted terminal access pursuant to registration or restricted access registration (RAR). The data communication system (100) may contain more than one channel (109), and therefore, the indicator (201) may reveal which channel(s) (109) have restricted registration access.

Figure 3:
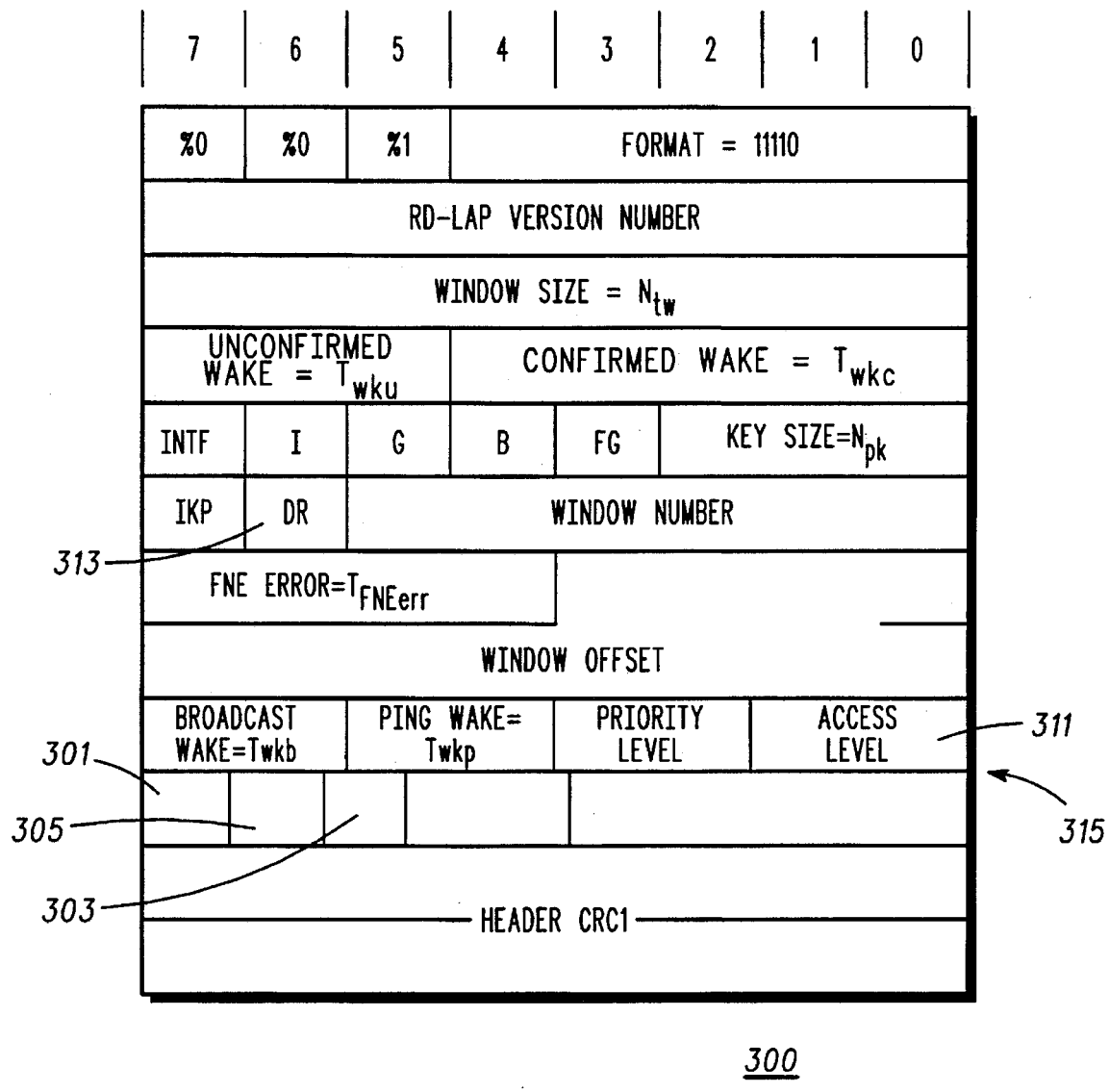
FIG. 3 is a representation of a further received message suitable for use in the preferred method embodiment in accordance with the instant invention.

Referring to the FIG. 3 representation of a further or alternative message suitable for use in the preferred embodiment, a SYNC message (300), similar to the SYNC message used in RD-LAP systems, is depicted. This message will also be broadcast from time to time, such as at the beginning of each frame on the downlink portion of the channel. All terminals will receive this message and it's contents allow each terminal to make various configuration decisions so as to facilitate further operation on the system. The SYNC message includes, among other data, a registration information (315). The registration information further corresponds to: a number of terminals expected to register for service on the system (301), a channel loading factor (305), a channel access level (311), a delay registration indicator or bit (DR) (313), a registration rate (303), or the like either singularly or in combination as circumstances dictate.

The number of terminals expected to register for service (301) is useful in determining the appropriate registration contention procedure since as the number of terminals expected to register (301) increases the probability of a collision during a registration attempt also increases. System changes may be used by the infrastructure (101) to estimate the number of terminals (301) that may attempt registration. For example, if a channel access level (311) on a particular channel (109) is lowered, the infrastructure (101) may anticipate that a large number of the newly authorized or lower priority terminals (103) will attempt to register.

The channel loading factor (305) is an indicator of how much radio traffic is occurring on the channel (109) for the data communication system (100). At times when the channel (109) is heavily loaded the registration of new terminals (103) may not be desirable. The infrastructure (101) may also send a channel access level (311) in order to set a threshold for the system (101) or set thresholds on particular channels (109). This value allows the infrastructure (101) to set a minimum value for the priority of a terminal (103) that is allowed to register on the channel (109) regardless of other circumstances. The infrastructure (101) thus can directly prioritize higher priority users, such as public safety, terminals (103) ahead of lower priority terminals (103), such as pizza delivery, with this indicator (311).

The SYNC message (300) also includes a registration rate (303) for the system which corresponds to the maximum rate at which the system is capable of registering terminals (103).

In the preferred method embodiment which is discussed in detail below, the infrastructure (101) may, given appropriate circumstances, send a delay registration indicator (313). This indicator (313) contains information on whether the infrastructure (101) requires the terminals (103) to engage in a registration contention procedure, preferably an adaptive random delay, before making a registration attempt.

Referring to the FIG. 4 flow chart, a method, embodiment in accordance with the instant invention, of adaptable registration will be described. Registration refers to any procedure or scheme that allows a terminal (103) to be recognized by the infrastructure (101) as a valid user of the data communication system (100) and which allows the terminal (103) to utilize the channel (109) for transmission, given of course a valid access attempt. A properly registered terminal is one that the infrastructure can properly establish a link with should the need arise. Generally the FIG. 4 process is suitable for implementation according to well known techniques in any general purpose controller executing appropriate operating software that is suitable for providing that type of function in a terminal or data terminal having a receiver, etc.. An example of such a terminal is the Info TAC™TMdata terminal available from Motorola, Inc. that uses a controller based on the Motorola MC 68300 series processor together with the Motorola MC 56000 digital signal processor.

Figure 4:
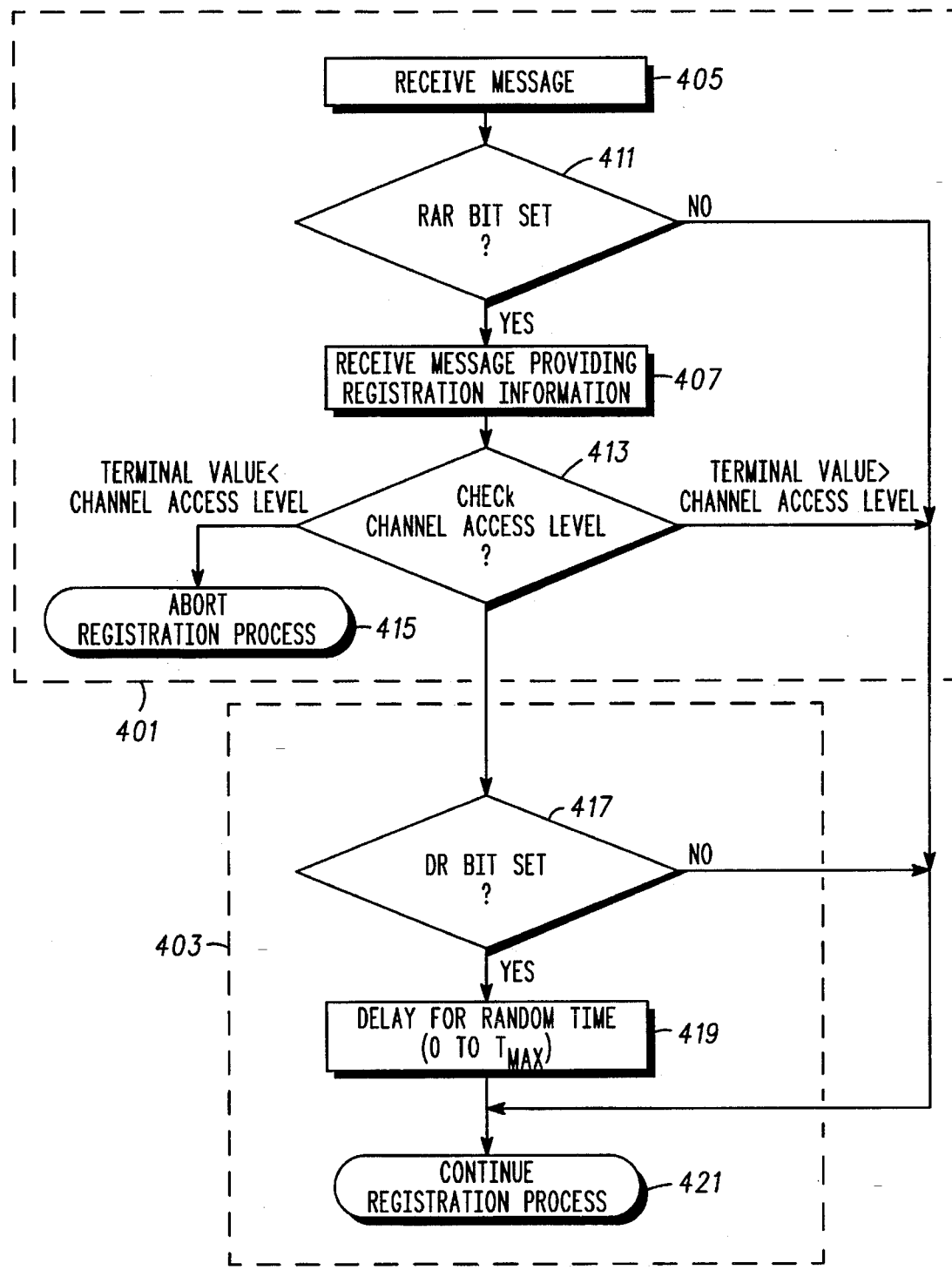
FIG. 4 is a flow chart of the preferred method of adaptable registration in accordance with the instant invention.

In order for the terminal (103) to register on the system (100), the terminal (103), typically at the direction of a controller, follows the preferred method of adaptable registration depicted in FIG. 4. The terminal (103) practices the FIG. 4 method by deriving or determining a registration status, at step (401), and executing a registration contention procedure that is adapted to the registration status at step (403). After successfully contending from step (403), if need be, the terminal continues with a normal registration procedure at step (421).

As an overview, Step (401) may eventually result in the terminal (103) aborting registration at step (415), engaging in or executing a registration contention procedure at step (403) or a normal registration procedure at step (421). The normal registration procedure is in accordance with known registration procedures implemented in present systems such as the RD-LAP system. Normal registration may include a registration access request followed by a grant and finally a message identifying the terminal and any particular requirements of the terminal for that specific system. Such normal registration procedures are generally known and in the interest of brevity need not be further discussed herein.

Specifically step (401) begins with step (405) where a message is received such as the message of FIG. 2. Then at step (411) the RAR or registration access restricted bit or symbol (201) is tested to determine whether it is set. If not, a normal registration may occur and the process proceeds to step (421) for that purpose. If the RAR bit is set the process continues to step (407) where a message, such as that depicted in FIG. 3, is received to provide a registration information. Next at step (413), preferably, the channel access level is compared to the terminal level and if the channel access level is greater, the registration process is aborted at step (415) and if the channel access level is less than the terminal value a normal registration process is undertaken at step (421). Note these conditions correspond respectively, to the infrastructure indicating that certain terminals are being denied service for lack of priority and priority being granted to a higher level unit than the infrastructure is now accepting for service. The terminal value corresponds to the class of service to which the terminal (103) has access. The terminal value may a dynamic value but is, preferably, a fixed value programmed into the terminal (103).

In any event, if the terminal value is equal to the channel access value the method proceeds to step (403). Step (403) begins by checking the DR bit at step (417). If the DR bit is not set the terminal (103) continues with the registration process in accordance with known techniques such as those used in RD-LAP. If the DR bit is set the method proceeds to step (419) where a random timer is triggered and the process delays for a random time that is, preferably, uniformly distributed between 0 and Tmax seconds. Tmax is derived according to the discussion below but generally will depend on the registration information received at step (407). Terminals with a longer Tmax will wait statistically longer than terminals with a shorter Tmax before attempting registration. As a general rule units that attempt registration more often, tht is experience a shorter random delay are more likely to find the channel idle and thus more likely to effect a registration at step (421).

In accordance with the preferred method embodiment, the random delay will be uniformly distributed from 0 to Tmax. However, as is apparent to those skilled in the art, other probability distributions may be implemented. For example, a distribution may be implemented where a terminal (103) is restricted from registering for a particular range of delay times, but otherwise, the terminal (103) delays registration for a random time limited by a maximum value.

Heretofore known registration procedures, in contrast to the methods disclosed here, required the terminal (103) to attempt registration at the next available time or opportunity when the channel access level was equal to the terminal value. If there was a large number of terminals (103) attempting registration a collision was likely to occur. In the preferred method; if the channel access level (311) is equal to the terminal value the terminal (103) evaluates the delay registration indicator (313) at step (417). If the delay registration indicator (313) does not require the terminal (103) to delay registration, the terminal (103) then continues with normal registration procedures at step (421). If the delay registration indicator (313) requires a time delay the terminal (103) delays registration for a random time having a maximum duration uniformly distributed from 0 to Tmax, at step (419), then continues with normal registration procedures at step (421). Tmax is, preferably, received as part of the SYNC message (300) by the terminal (103). If an unsuccessful registration attempt is made at step (421), the terminal (103) is not required to repeat the contention procedure of step (403). Rather, the terminal (103), in this case, simply attempts registration at the next available opportunity.

As an alternative to receiving Tmax in a message, as discussed above, Tmax will be derived by the terminal (103) or found by using a look-up table. The terminal will calculate Tmax from information it receives or from information available through other sources such as an internal counter, a clock or a fixed value in memory. The terminal may use a look-up table in addition to or instead of performing a calculation.

For example, Tmax may be a fixed value that is programmed into the terminal (103) in accordance with the particular communication system. Through experimentation and modeling it has been shown that a fixed value of 30 minutes for Tmax results in optimum results when the number of terminals utilizing a particular communication system is on the order of 10000. In typical systems implemented with the RD-LAP protocol, registration rates on the order of 2.7 registrations per second have been determined. In particular it was shown that the optimum Tmax value is derived by dividing the expected number of terminals (103) that will attempt registration by the registration rate. Several assumptions are made in determining the number of terminals (103) expected to register. The number of active terminals (103) with any single priority level is assumed to be 70% of the total system terminal capacity. The maximum number of terminals (103) that will re-register if the channel access level (311) is increased from the highest to lowest access level is assumed to be 50% of the system terminal capacity. The minimum number of terminals (103) which re-register on another channel when the channel access level (311) is increased is 15% of the system terminal capacity. The minimum number of terminals (103) which are turned off during the period when the channel access level (311) is increased is assumed to be 15% of the total system terminal capacity. These assumptions yield a fixed value of 30 minutes for Tmax.

Tmax may also be determined by evaluating various registration information or registration contention information that is received in the SYNC message (300). The terminal (103) will determine Tmax from or in accordance with the number of terminals expected to register for service (301) or the registration rate. The registration rate may either be a fixed value based on best estimates in the terminal or received as part of a message. Tmax is derived by dividing the number of terminals expected to register by the registration rate. The magnitude of Tmax will be selected to be proportional to the number of terminals expected to register (301) when the registration rate is a fixed value. Additionally, the magnitude of Tmax can be determined in accordance with the channel loading factor (305), solely or in combination with the number of terminals likely to register or registration rate. The Tmax may be chosen such that the magnitude of Tmax is directly proportional to the channel loading factor (305), because when the channel (109) is heavily loaded many system operators find it advantageous to discourage further registration attempts. A vector may be received that specifies information corresponding to a Tmax for different classes of terminals instead of a single Tmax value. For instance the number of terminals expected to register (301) field or the channel loading factor (305) field in the message of FIG. 2 may be a vector of information with a higher priority terminal selecting a different element in this field than a lower priority terminal. The selected element would be used in a further calculation or as a pointer for a look-up table, or directly as Tmax.

Tmax may be derived in accordance with a change in channel access level (311). When the terminal observes a change in the channel access level (311), Tmax is chosen such that its magnitude is inversely proportional to the direction of the change in channel access level (311). For example by observation and experimentation, if the channel access level decreases by one level and Tmax correspondingly increases from 10 minutes to 20 minutes acceptable results are obtained. Similaly if the channel access level is decreased by two levels Tmax should be increased from 10 minutes to 30 minutes. Since a change in channel access level (311) will likely correspond to a change in the number of terminals (103) that will attempt registration, changing Tmax according to the change in channel access level (311) will reduce the chances of a collision when the channel access level (311) drops and avoid requiring the terminals (103) to wait an unnecessarily long time when the channel access level (311) increases.

Further the calculation or location in the look-up table that the terminal utilizes may additionally be based on information that is not received. For instance it is contemplated that Tmax will be determined by evaluating information relevant to registration contention that is available to the terminal (103) without receiving a message. Registration may be more likely at certain times and thus Tmax would be based on time of day or week. Tmax may have a larger magnitude during typical high registration rate periods such as the mid morning hours when users are likely to activate terminals (103). Also, when the particular registration procedure being used requires the terminal (103) to delay for Tmax after an unsuccessful registration attempt, Tmax would likely be based on the number of registration attempts.

Figure 5:
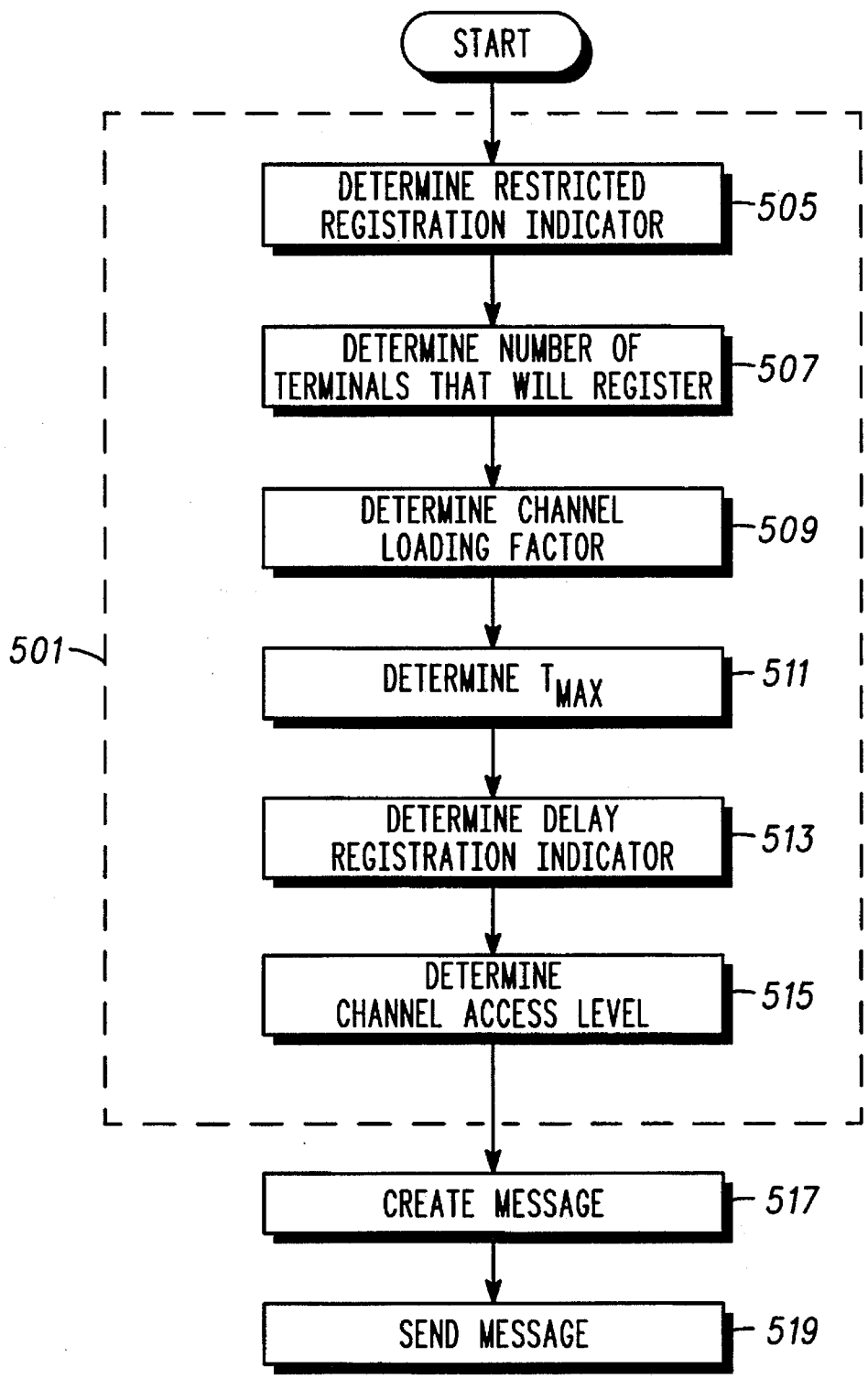
FIG. 5 is a flow chart of an alternative method embodiment in accordance with the instant invention.

Referring to FIG. 5, an alternative method embodiment, practiced at the infrastructure (101) is depicted. As depicted the method, at step (501), determines a system registration information, creates a message at step (517) and sends the message at step (519). The system registration information includes information corresponding to registration contention information that corresponds to a contention procedure suitable for or required for implementation by the terminals (103).

More specifically step (501) begins by setting the restricted registration indicator (201), at step (505), when so determined or circumstances warrant, such as when a channel access level has just been reduced or any other instance where the infrastructure (101) anticipates that a large number of terminals (103) may attempt registration or because channel loading appears to be or is likely to be excessive. The infrastructure (101) determines the number of terminals expected to register (113), at step (507), by for example, keeping a historical record of the number of registration attempts and the relation of the number of attempts to parameters such as the time of day or week, changes in channel access level (311), or other system parameters, such as number of collisions, in combination or singularly as circumstances dictate. At step (509), the infrastructure determines the channel loading factor (305) by deriving a value that corresponds to the ratio of the total number of terminals (103) registered on the system to the system's capacity for terminals. The infrastructure (101) determines Tmax at step (511) by dividing the number of terminals expected to register by the registration rate of the system. The infrastructure (101) can also determine or adjust Tmax using other information such as a change in channel access level (311) or the channel loading factor (305).

The infrastructure (101) sets the delay registration indicator (313) in two possible situations at step (513). One situation exists when the channel access level (311) is decreased for the particular channel (109). The infrastructure (101) simultaneously sets DR when it lowers the channel access level (311). In a second situation, DR is set on channels (109) which have a channel access level (311) such that it is possible for terminals (103) which have been revoked access on another channel (109) to attempt registration. This is the typical scenario that occurs when a channel access level (311) is increased on a particular channel (109) and lower priority terminals (103) are forced to re-register on other channels (109). The delay registration indicator (313) is cleared after a time necessary for registration of all terminals (103) which were anticipated to register. For example, this time could be chosen to be the product of the registration rate (303) of the system (100) and the anticipated number of registering terminals (301).

At step (515), the infrastructure determines the channel access level (311) in accordance with known methods such as those implemented in RD-LAP. The infrastructure then creates a message or multiple messages, as circumstances dictate, at step (517) and then sends the message or messages at step (519).

It will be appreciated by those of ordinary skill in the art that the disclosure provides various methods for effecting an adaptive registration procedure without unduly compromising communications services for data terminals. These inventive methods may be readily and advantageously employed in a packet data system or other communications system to enhance communications resource efficiency by reducing unproductive overhead associated with unsuccessful registration attempts while still providing service to terminals with the appropriate authorization levels, etc.. Hence, the present invention, in furtherance of satisfying a long-felt need of wireless data communications, readily facilitates data communications by providing an exemplary method of adaptive registration that can more appropriately allocate resources to the correct or most meritorious terminal.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a data communication system including infrastructure arranged to communicate with a plurality of communication units over a channel, a method of adaptable registration at a communication unit comprising:

receiving at least one message indicative of a change in access level and including registration information:

determining whether to register based on a current access level and when to register based on the registration information: and sending a registration message after a delay based on the registration information.

2. The method of claim 1 wherein said step of determining when to register comprises, when the at least one message includes a restricted access indicator, determining the delay based on the registration information.

3. The method of claim 2 wherein said step of determining the delay based on the registration information comprises determining the delay based on at least a portion of the registration information corresponding to a number of communication units anticipated to attempt registration.

4. The method of claim 2 wherein said step of determining the delay based on the registration information comprises determining the delay based on at least a portion of the registration information corresponding to a delay registration indicator.

5. The method claim 2 wherein said step of determining the delay based on the registration information comprises determining the delay based on at least a portion of the registration information corresponding to a channel access level.

6. The method of claim 1 wherein said step of determining when to register comprises determining the delay based on a communication unit priority.

7. The method of claim 1 wherein said step of determining when to register comprises determining the delay based on a number of registration attempts of the communication unit.

8. The method of claim 1 wherein the step of sending comprise waiting a random time before attempting to register.

9. The method of claim 8 wherein a maximum duration of said random time corresponds to said registration information.

10. In a data communication system including infrastructure arranged to communicate with a plurality of communication units over a channel, a method of facilitating adaptable registration by the communication units, practiced at the infrastructure, the method including the steps of:

determining, when changing an access level, whether to restrict registration and if so, determining a registration information for use by said plurality of communication units in determining when to register: and sending a message indicative of a chance in access level and including the registration information.

11. The method of claim 10 wherein said step of sending said message comprises sending said message wherein said message corresponds to a number of communication units anticipated to attempt registration.

12. The method of claim 10 wherein said step of sending said message comprises sending said message wherein said message includes a restricted access indicator.

13. The method of claim 10 wherein said step of sending said message comprises sending said message wherein said message corresponds to a delay registration indicator.

* * * * *